(12) United States Patent
Chen et al.

(10) Patent No.: US 11,710,043 B2
(45) Date of Patent: *Jul. 25, 2023

(54) NON-UNIFORM QUANTIZATION OF PRE-TRAINED DEEP NEURAL NETWORK

(71) Applicant: Samsung Electronics Co., Ltd., Suwon-si (KR)

(72) Inventors: Hui Chen, Lake Forest, CA (US); Ilia Ovsiannikov, Studio City, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 17/744,601

(22) Filed: May 13, 2022

(65) Prior Publication Data
US 2022/0269945 A1    Aug. 25, 2022

Related U.S. Application Data

(63) Continuation of application No. 16/181,326, filed on Nov. 5, 2018, now Pat. No. 11,348,009.

(60) Provisional application No. 62/735,839, filed on Sep. 24, 2018.

(51) Int. Cl.
*G06N 3/04* (2023.01)
*G06N 3/082* (2023.01)

(52) U.S. Cl.
CPC .............. *G06N 3/082* (2013.01); *G06N 3/04* (2013.01)

(58) Field of Classification Search
CPC ................................. G06N 3/082; G06N 3/04

USPC .......................................................... 706/15
See application file for complete search history.

(56) References Cited

U.S. PATENT DOCUMENTS

| | | | |
|---|---|---|---|
| 9,916,531 B1 | 3/2018 | Zivkovic et al. | |
| 2012/0002712 A1* | 1/2012 | Hayami | G11B 20/10009 375/232 |
| 2014/0050418 A1* | 2/2014 | Liu | H04N 5/378 382/270 |
| 2016/0328647 A1* | 11/2016 | Lin | G06F 17/11 |
| 2017/0270408 A1 | 9/2017 | Shi et al. | |
| 2017/0286830 A1 | 10/2017 | El-Yaniv et al. | |
| 2018/0046903 A1 | 2/2018 | Yao et al. | |

(Continued)

OTHER PUBLICATIONS

Gray et al., "Quantization Noise Spectra", IEEE Transactions on Information Theory, vol. 36, No. 6, Nov. 1990 (Year: 1990).*

(Continued)

*Primary Examiner* — Tsu-Chang Lee
(74) *Attorney, Agent, or Firm* — Renaissance IP Law Group LLP

(57) ABSTRACT

A system and a method of quantizing a pre-trained neural network, includes determining by a layer/channel bit-width determiner for each layer or channel of the pre-trained neural network a minimum quantization noise for the layer or the channel for each master bit-width value in a predetermined set of master bit-width values; and selecting by a bit-width selector for the layer or the channel the master bit-width value having the minimum quantization noise for the layer or the channel. In one embodiment, the minimum quantization noise for the layer or the channel is based on a square of a range of weights for the layer or the channel that is multiplied by a constant to a negative power of a current master bit-width value.

19 Claims, 3 Drawing Sheets

(56) References Cited

U.S. PATENT DOCUMENTS

2018/0107926 A1  4/2018  Choi et al.

OTHER PUBLICATIONS

Wang et al., "Efficient Hardware Architectures for Deep Convolutional Neural Network", IEEE Transactions on Circuits and Systems-I: Regular Papers, vol. 65, No. 6, Jun. 2018 (Year: 2018).*
Gray, Robert M., "Quantization Noise Spectra," IEEE Transactions on Information Theory, vol. 36, No. 6, Nov. 1990, pp. 1220-1244.
Notice of Allowance for U.S. Appl. No. 16/181,326, dated Jan. 28, 2022.
Office Action for U.S. Appl. No. 16/181,326, dated Oct. 6, 2021.
Wang, Jichen et al., "Efficient Hardware Architectures for Deep Convolutional Neural Network," IEEE Transactions on Circuits and Systems-I: Regular Papers, vol. 65, No. 6, Jun. 2018, pp. 1941-1953.

* cited by examiner

NON-UNIFORM QUANTIZATION OF PRE-TRAINED DEEP NEURAL NETWORK

CROSS-REFERENCE TO RELATED APPLICATION

This application is a continuation of U.S. patent application Ser. No. 16/181,326, filed on Nov. 5, 2018, which claims the priority benefit under 35 U.S.C. § 119(e) of U.S. Provisional Patent Application Ser. No. 62/735,839 filed on Sep. 24, 2018, the disclosures of which are incorporated herein by reference in their entirety.

TECHNICAL FIELD

The subject matter disclosed herein relates to neural networks. More specifically, the subject matter disclosed herein relates to a quantization technique may be used to provide guidance for selecting optimal layer-wise or channel-wise bit-width quantization values for weights and/or activations of a deep neural network.

BACKGROUND

Quantization of weights and/or activations of a pre-trained deep neural network (DNN) provide a way to run the DNN in a resource-limited device, such as, but not limited to, a smartphone. Typical approaches have been to assign the same bit-width quantization value to each layer or channel for weights and/or activations without regard to the fact that the weights and/or activations of each layer or channel play a different contributing role in the overall accuracy of the DNN.

SUMMARY

An example embodiment provides a system to quantize a pre-trained neural network that may include a range determiner, a squarer, a multiplier and a comparator. The range determiner may determine a range of weights for a selected layer or channel of the pre-trained neural network. The squarer may square the range of weights for the selected layer or channel. The multiplier may multiply the square of the range of weights for the selected layer or channel by a constant to a negative power of a current master bit-width value selected from a set of master bit-width values. The comparator may compare the output of the multiplier for each current master bit-width value selected from the set of master bit-widths values for the selected layer or channel and may select for the selected layer or channel the master bit-width value corresponding to the minimum value output from the multiplier. In one embodiment, the constant may be 4. In another embodiment, the set of master bit-width values may include values between 4 and 10 inclusive. In still another embodiment, the range of weights for each layer or channel further may include a range of weights and activations for each layer or channel of the pre-trained neural network.

An example embodiment provides a system to quantize a pre-trained neural network that may include a range determiner, a first multiplier, a second multiplier and a bit-width selector. The range determiner may determine a range of weights for a selected layer or channel of the pre-trained neural network. The first multiplier may square the range of weights for the selected layer or channel. The second multiplier may multiply the square of the range of weights for the selected layer or channel by a constant to a negative power of a current master bit-width value selected from a set of master bit-width values. The bit-width selector may select for the selected layer or the selected channel the master bit-width value corresponding to a minimum value output from the second multiplier. In one embodiment, the system may further include a controller that may control the range determiner, the first multiplier, the second multiplier and the bit-width selector to select a bit-width for each layer or channel of the pre-trained neural network.

An example embodiment provides a method of quantizing a pre-trained neural network in which the method may include: determining by a layer/channel bit-width determiner for each layer or channel of the pre-trained neural network a minimum quantization noise for the layer or the channel for each master bit-width value in a predetermined set of master bit-width values; and selecting by a bit-width selector for the layer or the channel the master bit-width value having a minimum quantization noise for the layer or the channel. In one embodiment, the minimum quantization noise for the layer or the channel is based on a square of a range of weights for the layer or the channel that is multiplied by a constant to a negative power of a current master bit-width value. In another embodiment, the constant may be 4. In still another embodiment, the set of master bit-width values may include values between 4 and 10 inclusive.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
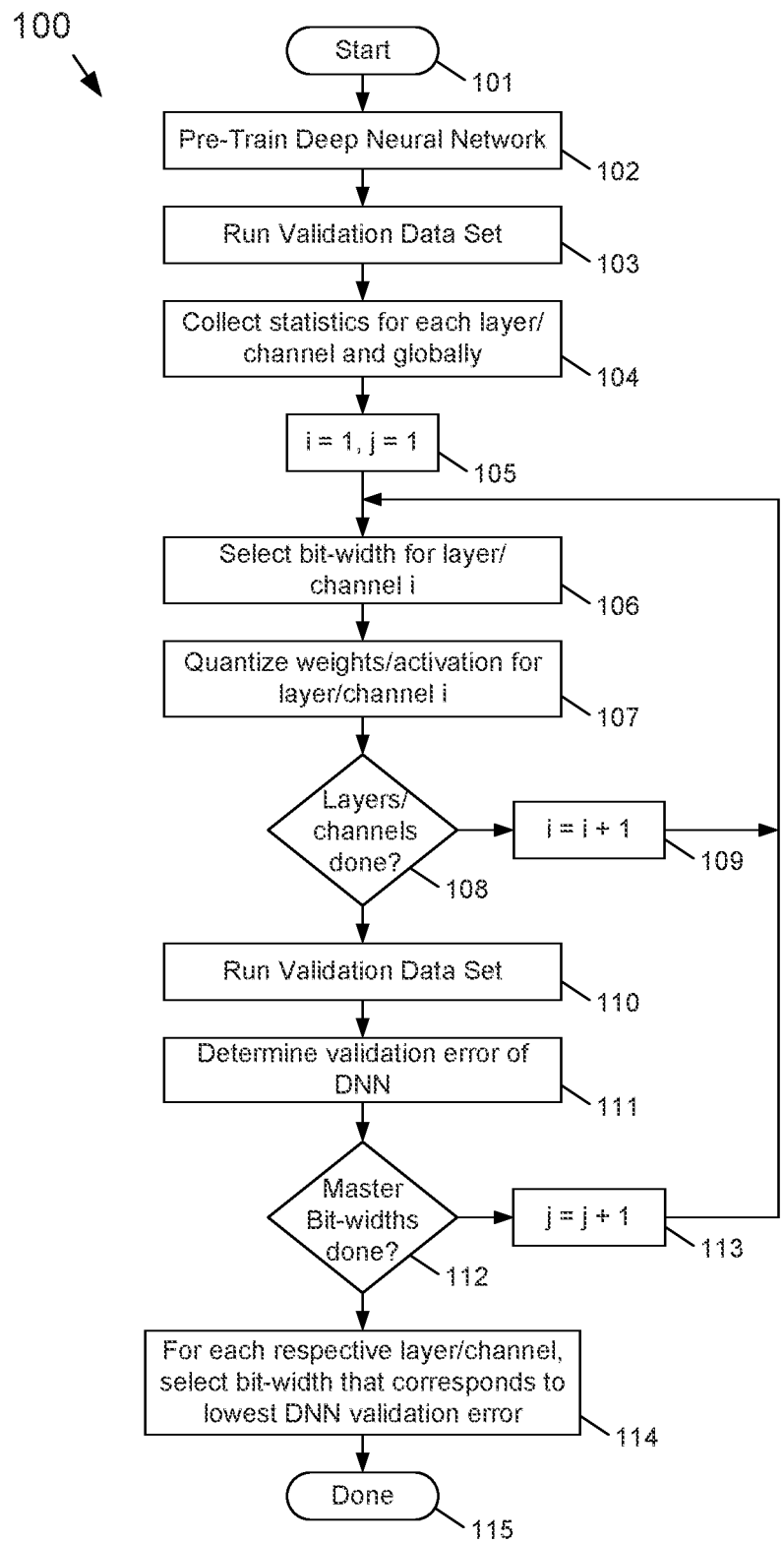
FIG. 1 depicts an example embodiment of a "one-shot bit determination" technique or method for quantizing a pre-trained DNN according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein. Additionally, the described aspects can be implemented to perform low power, 3D-depth measurements in any imaging device or system, including, but not limited to, a smartphone, a User Equipment (UE), and/or a laptop computer.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

The subject matter disclosed herein provides a fast, simple and efficient quantization technique for a pre-trained DNN without re-training the DNN after quantization. The quantization technique, referred to herein as a "one-shot bit determination" technique, may be used to provide guidance for selecting an optimal layer-wise or channel-wise bit-width quantization values for weights and/or activations. The technique disclosed herein provides better accuracy than typical quantization approaches because it is based on the fact that the loss caused by quantization may be directly related to weight gradient and a range of the weights and/or activations that are quantized.

The bit-width quantization technique disclosed herein accounts for the effect of the quantization of an individual layer within a DNN, which may be quantified by the informational statistics for each layer, such as, but not limited to, a variance of gradients and a range of weight/activation values that are to be quantized. The error attributed to the quantization may be analyzed to determine how the quantization of each layer affects the overall accuracy of the DNN.

The subject matter disclosed herein may use statistical information of gradients of weights and/or activation or range of weights and/or activations as a guidance to select the optimal bit width for each layer channel-wise or layer-wise. For example, consider the problem of minimizing the loss L(w) of a DNN, which may be defined as $$L(w) = -\frac{1}{N}\sum_{1}^{N} t\log(y(w)) \quad (1)$$

in which t is a target, y(w) is the normalized softmax output, N is the size of training samples, and w is a long vector of concatenation of weights for each layer of a deep neural network.

The change in loss L(w) based on a change in w may be considered to be $$L(w + \Delta w) \approx L(w) + \left(\frac{\partial L}{\partial W}\right)^T \Delta w. \quad (2)$$

So, $$\Delta L = L(w + \Delta w) - L(w) \approx \left(\frac{\partial L}{\partial W}\right)^T \Delta w = \sum_{i=1}^{n}\left(\frac{\partial L}{\partial w_i}\right)^T * \Delta w_i, \quad (3)$$

and $$\text{var}(\Delta L) = \sum_{i=0}^{n-1} \text{var}\left(\frac{\partial L}{\partial w_i}\right) * \text{var}(\Delta w_i), \quad (4)$$

with $$\frac{\partial L}{\partial w_i} = \frac{\partial L}{\partial y} x^T \quad y = w_i x. \quad (5)$$

Accordingly, minimization of quantization error may be equivalent to reducing the effects of quantization on the accuracy of the DNN. Thus, in order to minimize the variance of the quantization error ΔL, either the $$\text{var}\left(\frac{\partial L}{\partial w_i}\right)$$

or the var(Δw$_i$) should be minimized, in which $$\text{var}(\Delta w_i) = \frac{(w_{max} - w_{min})^2}{12} * 4^{-b}.$$

FIG. 1 depicts an example embodiment of a "one-shot bit determination" technique, or method, 100 for quantizing a pre-trained DNN according to the subject matter disclosed herein. The technique starts at 101. At 102, a DNN is pre-trained. At 103, a validation data set is run on the DNN to obtain global information about the performance of the DNN, such as network accuracy and error information. In one embodiment, the global information may include statistic information, such as, but not limited to, the standard deviation of the gradients of the weights and/or activations, and the range of weights and/or activation that are to be quantized. At 104, statistical information is collected for each layer and/or channel, such as, but not limited to a range of weights and/or activations for each layer and/or each channel. In one embodiment, the statistic information that may be obtained and used for each layer and/or channels may include, but is not limited to, the standard deviation of the gradients of the weights and/or activations, and the range of weights and/or activation that are to be quantized.

At 105, an index i may be initialized for iteratively quantizing the layers/channels of the DNN. Additionally at 105, an index j may be initialized that may be used for iteratively selecting master bit-width values from a set of master bit-width values for evaluation. In one embodiment, the set of master bit-width values may include values between 4 and 10, inclusive. In another embodiment, the set of master bit-width values may be different.

At 106, a first master bit-width j is selected for quantizing the layers/channels of the pre-trained DNN. At 107, the weights and/or activations for the layer/channel i may be quantized based on the current master bit-width j selected from the set of master bit-width values. More specifically, the bit-width for the weights and/or activations of layer/channel i may be quantized based on the selected master bit-width, the global statistics obtained for the pre-trained DNN and the statistics obtained for the particular layer/channel. In one embodiment, the bit-width for a layer/channel i may be quantized based on the product of the currently selected master bit-width multiplied by the square root of a ratio of the layer/channel statistics over the global statistics.

At 108, it is determined whether the weights and/or activations of all layers/channels of the pre-trained DNN have been quantized to the currently selected master bit-width. If not, flow continues to 109 where the index i is incremented and flow returns to 105. If, at 108, the weights and/or activations of all layers/channels of the pre-trained DNN have been quantized by the currently selected master bit-width, flow continues to 110 where the validation data set is run on the DNN in which the weights/activation for all of the layers/channels have been quantized to the currently selected master bit-width j. At 111, the validation error of the DNN is determined and recorded, or stored in, for example, a memory.

At 112, it is determined whether all of the master bit-widths in the set of master bit-widths have been evaluated. If not, flow continues to 113, where the index j is incremented and flow returns to 106 where the next master bit-width is selected and the weights and/or activation of all of the layers/channels of the pre-trained DNN are quantized to the currently selected master bit-width. If, at 112, all of the master bit-widths of the set of master bit-widths have been selected, flow continues to 114.

At 114, for each layer/channel, the bit-width that corresponds to the lowest quantized-DNN validation error is selected for that layer/channel. Flow continues to 115, where the method ends. Other considerations may apply when selecting the bit-width value, so at 114 the results may be used as guidance for selecting an optimal bit-width value for a layer/channel.

Figure 2:
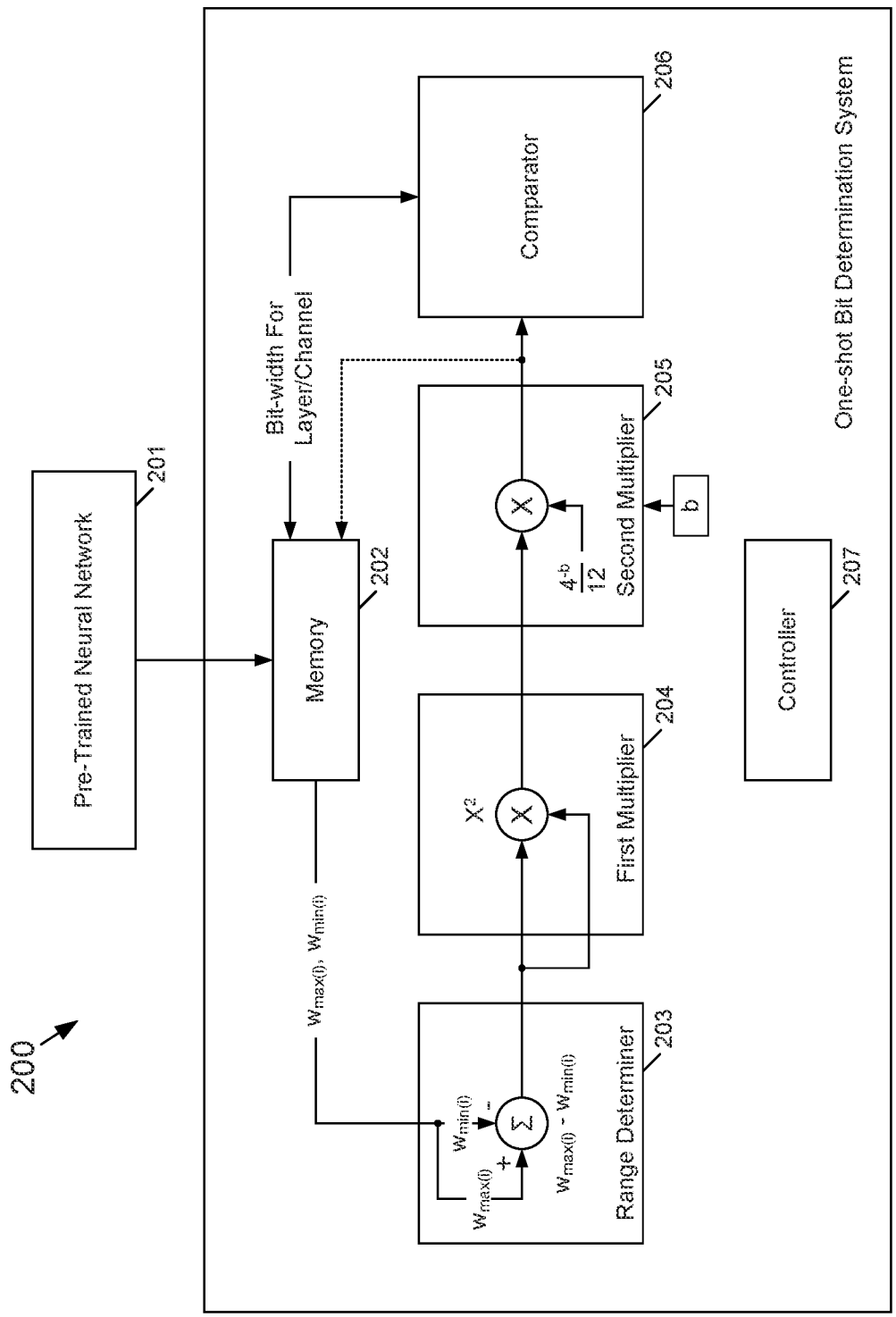
FIG. 2 depicts a functional block diagram of an example embodiment of a one-shot bit determination system according to the subject matter disclosed herein.

FIG. 2 depicts a functional block diagram of an example embodiment of a one-shot bit determination system 200 according to the subject matter disclosed herein. The system 200 may include a memory 202, a range determiner 203, a first multiplier 204, a second multiplier 205 and a comparator 206. In some embodiments, the system 200 may include a controller 207 that may provide an iterative-type of functionality. In one embodiment, the system 200 may be embodied as a module that may be any combination of software, firmware and/or hardware configured to provide the functionality of the system 200. In another embodiment, one or more of the functional blocks of the system 200 may be modules, in which case such a module may be any combination of software, firmware and/or hardware configured to provide the functionality described herein in connection with the particular module.

A validation data set may be run on a pre-trained DNN 201 that is to be quantized by the one-shot bit determination system 200. Global statistical information may be collected and stored in the memory 202. Additionally, statistical information for each layer/channel may also be stored in the memory 202.

For each different layer/channel and for each different master bit-width b in a set of master bit-widths, the validation data set is run on the DNN 201 and evaluated by the system 200 using, for example, the technique 100 depicted in FIG. 1. For each iteration, a range of weights and/or activations may be determined by the range determiner 203. The output of the range determiner 203 is input to the first multiplier 204. The first multiplier 204 squares the output of the range determiner 203. The output of the first multiplier 204 is input to the second multiplier 205 and is multiplied by a constant to the negative power of the current bit-width value b. In one embodiment, the second multiplier 205 multiplies the output of the first multiplier 204 by $4^{-b}/12$. The output of the second multiplier 205 represents a variance value of the overall error of the DNN based on the quantized weights/activations for the current master bit-width for the current layer/channel. In one embodiment, the output of the second multiplier may be input to a comparator 206 that keeps track of the variance values for the different master bit-widths that are evaluated for a current layer/channel. The variance value that is the least may then be selected by the comparator 206 as the bit-width quantization for the current layer/channel. In an alternative embodiment, the output of the second multiplier 205 may be stored in the memory for subsequent evaluation by the comparator 206.

Each layer/channel of the deep neural network 201 may be evaluated by the one-shot bit determination system 200, and the determined bit-width for the layer/channel may be used to quantize the corresponding layer/channel of the pre-trained neural network so that the pre-trained neural network may be run in a resource-limited device, such as, but not limited to, a smartphone.

Figure 3:
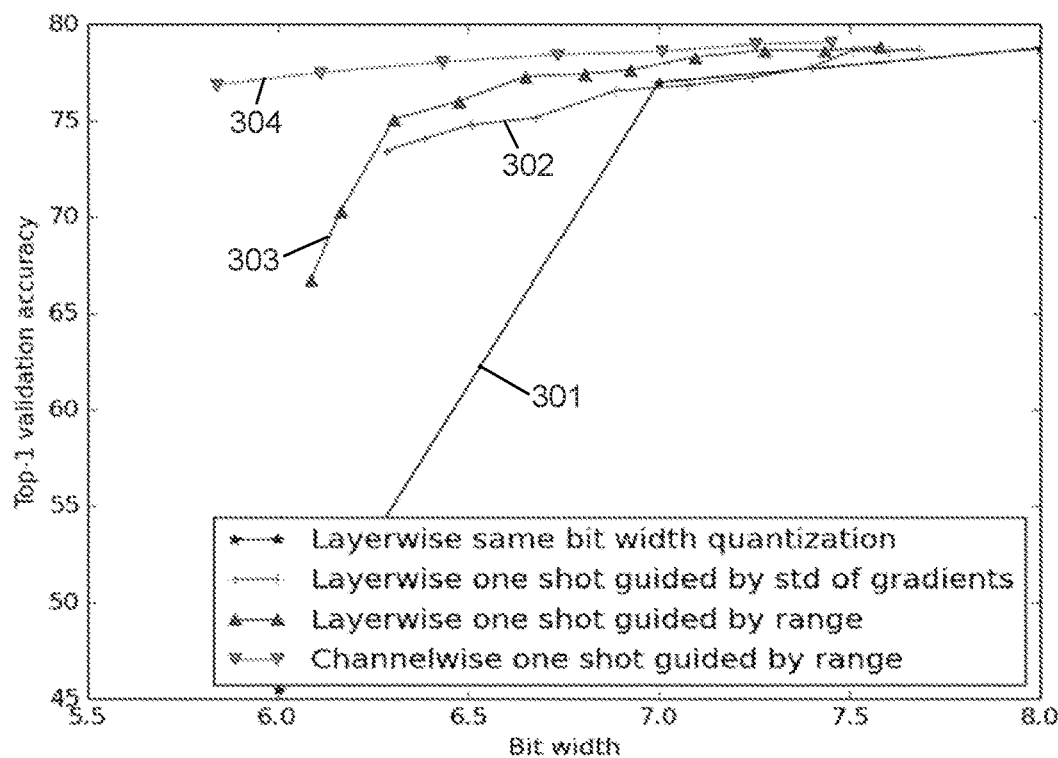
FIG. 3 is a graph showing results of the one-shot bit determination quantization technique in comparison to a typical quantization technique performed on a commercially available DNN.

FIG. 3 is a graph showing results of the one-shot bit determination quantization technique in comparison to a typical quantization technique performed on a commercially available DNN. In FIG. 3, the abscissa is bit width, and the ordinate is Top-1 validation accuracy. Curve 301 indicates the Top-1 validation accuracy as a function of bit width when quantization is performed in a typical manner in which the same bit-width quantization is used for each layer of the DNN. Curve 302 indicates the Top-1 validation accuracy for the one-shot determination quantization technique as a function of bit width in which selection of a layer-wise bit-width quantization value is based on a standard deviation of the gradient of weights. Curve 303 indicates the Top-1 validation accuracy for the one-shot determination quantization technique as a function of bit width in which selection of a layer-wise bit-width quantization value is based on a range of weights. Curve 304 indicates the Top-1 validation accuracy for the one-shot determination quantization technique as a function of bit width in which selection of a channel-wise bit-width quantization value is based on a range of weights. For a typical approach, a relatively accurate result is not obtained until the bit-width quantization is 7 bits, whereas each of the three one-shot determination quantization techniques may provide a much better relative accuracy result for a smaller bit-width value. In particular, the one-shot determination quantization technique in which selection of a channel-wise bit-width quantization value is based on a range of weights (curve 304) may provide relatively accurate results for a 6-bit-width quantization value.

Figure 4:
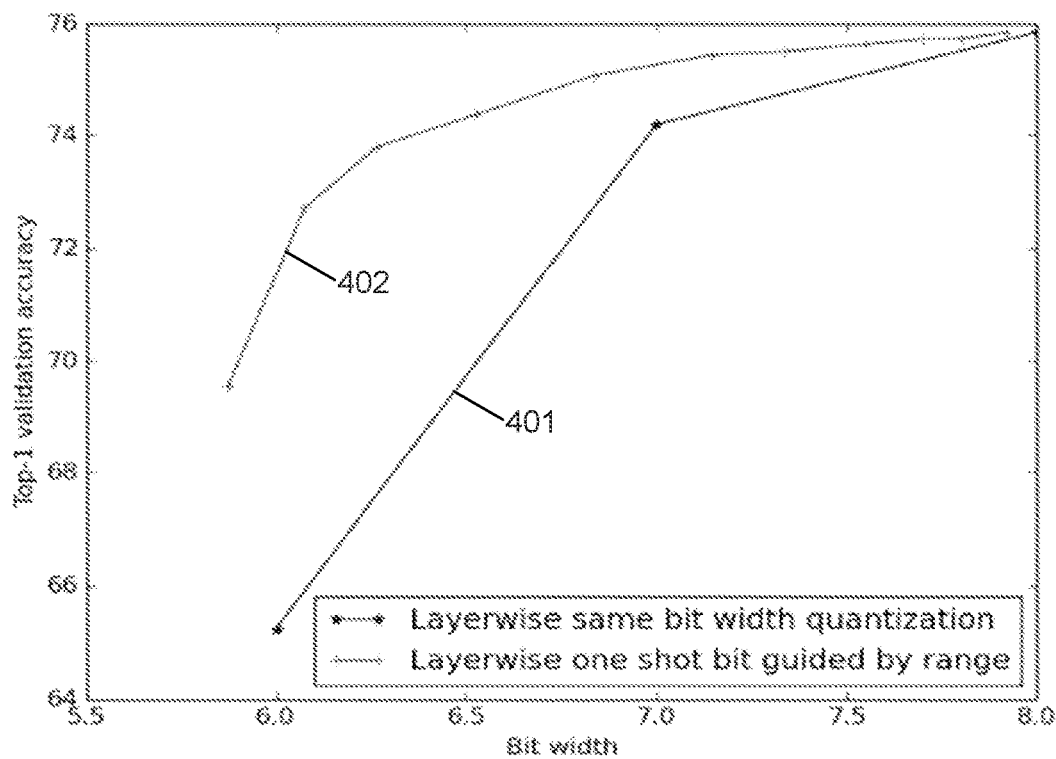
FIG. 4 is a graph showing results of the one-shot bit determination quantization technique in comparison to a typical quantization technique performed on another commercially available DNN.

FIG. 4 is a graph showing results of the one-shot bit determination quantization technique in comparison to a typical quantization technique performed on another commercially available DNN. In FIG. 4, the abscissa is bit width, and the ordinate is Top-1 validation accuracy. Curve 401 indicates the Top-1 validation accuracy as a function of bit width when quantization is performed in a typical manner in which the same bit-width quantization is used for each layer of the DNN. Curve 402 indicates the Top-1 validation accuracy as a function of bit width for the one-shot determination quantization technique in which selection of a layer-wise bit-width quantization value is based on a range of weights.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A system to quantize a pre-trained neural network, the system comprising:
   a squaring circuit configured to square a first value representing a range of weights for a selected layer or a selected channel of the pre-trained neural network and to output a first signal representing a square of the first value;
   a multiplier circuit configured to multiply the first signal by a second signal representing a constant to a negative power of at least one current master bit-width value selected from a set of master bit-width values and to output a third signal; and
   a selector circuit configured to select for the selected layer or the selected channel the master bit-width value corresponding to a minimum value of the third signal for the selected layer or the selected channel.

2. The system of claim 1, wherein the constant is 4.

3. The system of claim 2, wherein the set of master bit-width values includes values between 4 and 10 inclusive.

4. The system of claim 2, wherein the range of weights for at least one layer or at least one channel further includes a range of weights and activations for the at least one layer or the at least one channel of the pre-trained neural network.

5. The system of claim 1, further comprising a controller circuit configured to control the squaring circuit, the multiplier circuit and the selector circuit to select a bit-width for the selected layer or the selected channel of the pre-trained neural network.

6. The system of claim 5, wherein a validation data set is input to the pre-trained neural network for determining the bit-width value corresponding to the minimum value of the third signal for the selected layer or the selected channel.

7. A system to quantize a pre-trained neural network, the system comprising:
   a first multiplier circuit configured to square a first value representing a range of weights for a selected layer or a selected channel of the pre-trained neural network and to output a first signal representing a square of the first value;
   a second multiplier circuit configured to multiply the first value by a constant to a negative power of at least one current master bit-width value selected from a set of master bit-width values and to output a second signal; and
   a bit-width selector circuit configured to select for the selected layer or the selected channel the master bit-width value corresponding to a minimum value of the second signal output from the second multiplier circuit for the at least one current master bit-width value selected from the set of master bit-width values.

8. The system of claim 7, wherein the constant is 4.

9. The system of claim 8, wherein the set of master bit-width values includes values between 4 and 10 inclusive.

10. The system of claim 8, wherein the range of weights for at least one layer or at least one channel further includes a range of weights and of activations for the at least one layer or the at least one channel.

11. The system of claim 7, further comprising a controller circuit configured to control the first multiplier circuit, the second multiplier circuit and the bit-width selector circuit to select the bit-width for the selected layer or the selected channel.

12. The system of claim 11, wherein a validation data set is input to the pre-trained neural network for determining the selected bit-width value for the selected layer or the selected channel.

13. A method of quantizing a pre-trained neural network, the method comprising:
    determining, by a layer/channel bit-width determiner circuit, for a layer or a channel of the pre-trained neural network a minimum quantization noise signal for the layer or the channel for at least one master bit-width value selected from a predetermined set of master bit-width values; and
    selecting, by a bit-width selector circuit, for the layer or the channel of the pre-trained neural network a master bit-width value having the minimum quantization noise signal for the layer or the channel.

14. The method of claim 13, wherein determining the minimum quantization noise signal for the layer or the channel comprises:
    generating, by a range determiner circuit, a first signal representing a range of weights for the layer or the channel;
    multiplying, by a first multiplier, the first signal by the first signal to output a second signal representing a square of the range of weights for the layer or the channel; and
    multiplying, by a second multiplier, the second signal by third signal representing a constant to a negative power of a currently selected master bit-width value to output a quantization noise signal for the currently selected master bit-width value for the layer or the channel.

15. The method of claim 14, wherein the constant is 4.

16. The method of claim 15, wherein the predetermined set of master bit-width values includes values between 4 and 10 inclusive.

17. The method of claim 13, wherein determining the minimum quantization noise signal comprises:
    multiplying, by a first multiplier, a first signal representing a range of weights for the layer or the channel by the first signal to output a second signal representing a square of a range of weights and of activations for the layer or the channel; and
    multiplying, by a second multiplier, the second signal by third signal representing a constant to a negative power of a currently selected master bit-width value to output a quantization noise signal for the currently selected master bit-width value for the layer or the channel.

18. The method of claim 17, wherein determining for the layer or the channel of the pre-trained neural network the minimum quantization noise signal for the layer or the channel further comprises inputting a validation data set into an input of the pre-trained neural network at least one each master bit-width value selected from the predetermined set of master bit-width values.

19. The method of claim 13, wherein determining the minimum quantization noise signal comprises multiplying, by a first multiplier, a first signal representing a square of a range of weights and of activations for the layer or the channel by a second signal representing a constant to a negative power of a currently selected master bit-width value.

* * * * *